(12) United States Patent
Finegold et al.

(10) Patent No.: US 9,794,455 B2
(45) Date of Patent: Oct. 17, 2017

(54) MECHANICALLY ISOLATED EXTERNAL CONNECTOR

(71) Applicant: Seek Thermal, Inc., Santa Barbara, CA (US)

(72) Inventors: Joseph G. Finegold, Santa Barbara, CA (US); Blake Henry, San Barbara, CA (US); Scott Dayton, San Jose, CA (US)

(73) Assignee: Seek Thermal, Inc., Santa Barbara, CA (US)

( * ) Notice: Subject to any disclaimer, the term of this patent is extended or adjusted under 35 U.S.C. 154(b) by 81 days.

(21) Appl. No.: 14/839,685

(22) Filed: Aug. 28, 2015

(65) Prior Publication Data

US 2016/0065802 A1    Mar. 3, 2016

Related U.S. Application Data

(60) Provisional application No. 62/043,252, filed on Aug. 28, 2014.

(51) Int. Cl.
*H04N 5/225* (2006.01)
*H04N 5/33* (2006.01)
*G03B 17/02* (2006.01)
*G06F 1/16* (2006.01)

(52) U.S. Cl.
CPC ......... *H04N 5/2252* (2013.01); *G06F 1/1686* (2013.01); *H04N 5/33* (2013.01); *G03B 17/02* (2013.01); *H04N 2201/0034* (2013.01); *H04N 2201/0056* (2013.01)

(58) Field of Classification Search
CPC ...... H04N 5/2251–5/2254; H04N 5/33; H04N 2201/0008; H04N 2201/0034; H04N 2201/0056; H01R 13/6315; G03B 17/00–17/17; G03B 19/00–19/026; G03B 19/12; G03B 19/18–19/22; G06F 1/1686; Y10S 439/914
See application file for complete search history.

(56) References Cited

U.S. PATENT DOCUMENTS

| | | | | |
|---|---|---|---|---|
| 2002/0177330 A1* | 11/2002 | Haffenden | ......... | H01R 13/6315 439/6 |
| 2004/0041911 A1* | 3/2004 | Odagiri | ................. | G06F 1/1632 348/207.1 |
| 2011/0299846 A1* | 12/2011 | Weisbach | ............. | H04N 5/2254 396/453 |

(Continued)

*Primary Examiner* — Roberto Velez
*Assistant Examiner* — Quan Pham
(74) *Attorney, Agent, or Firm* — Knobbe, Martens, Olson & Bear, LLP

(57) ABSTRACT

An imaging system includes a housing, circuitry within the housing, and a connector coupled to the circuitry and extending from the housing for electrical and mechanical connection with a personal electronic device. The connector can be secured to the housing using a connector support that is resilient and flexible. The connector can be electrically coupled to a main printed circuit board assembly using a flexible circuit. The resilient connector support can be configured to allow movement of the connector relative to the housing. The flexible circuit is configured to maintain electrical connection to the main printed circuit board assembly when the connector moves relative to the housing. The imaging system can be a thermal imaging system and may include an infrared camera core.

11 Claims, 4 Drawing Sheets

(56) References Cited

U.S. PATENT DOCUMENTS

| | | | | |
|---|---|---|---|---|
| 2013/0178245 A1* | 7/2013 | Kulas | ........... | H04M 1/0254 |
| | | | | 455/556.1 |
| 2014/0240689 A1* | 8/2014 | Arbouzov | ........... | G01S 17/023 |
| | | | | 356/4.01 |
| 2014/0300809 A1* | 10/2014 | Oliveira | ........... | H04N 5/232 |
| | | | | 348/376 |

* cited by examiner

MECHANICALLY ISOLATED EXTERNAL CONNECTOR

CROSS-REFERENCE TO RELATED APPLICATIONS

This application claims the benefit of priority from U.S. Prov. App'n No. 62/043,252, filed Aug. 28, 2014, entitled "Mechanically Isolated External Connector," which is incorporated by reference herein in its entirety.

BACKGROUND

Field

The present disclosure generally relates to a connector for a peripheral device designed to be used when connected to a mobile electronic device, and more particularly to a mechanically isolated connector for such a peripheral device.

Description of Related Art

The increasing availability of high-performance, low-cost uncooled infrared imaging devices, such as bolometer focal plane arrays (FPAs), is enabling the design and production of mass-produced, consumer-oriented infrared (IR) cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced IR cameras may have different design requirements than complex military or industrial systems. New approaches to designing such devices may be advantageous to promote wide-spread use of consumer-oriented thermal imaging devices.

SUMMARY

Example embodiments described herein have innovative features, no single one of which is indispensable or solely responsible for their desirable attributes. Without limiting the scope of the claims, some of the advantageous features will now be summarized.

An imaging system includes a housing, circuitry within the housing, and a connector coupled to the circuitry and extending from the housing for electrical and mechanical connection with a personal electronic device, The connector can be secured to the housing using a connector support that is resilient and flexible. The connector can be electrically coupled to a main printed circuit board assembly using a flexible circuit. The resilient connector support can be configured to allow movement of the connector relative to the housing to reduce strain on a connected personal electronic device. The flexible circuit is configured to maintain electrical connection to the main printed circuit board assembly when the connector moves relative to the housing. The imaging system can be a thermal imaging system and may include an infrared camera core.

In a first aspect, an imaging system is provided that includes a housing configured to enclose and support components of the imaging system. The imaging system includes a main printed circuit board rigidly coupled to the housing. The imaging system includes a connector configured to connect to a personal electronic device, the connector configured to provide a mechanical and electrical connection to a personal electronic device, the connector extending from an interior portion of the housing to an exterior portion of the housing. The imaging system includes a connector support comprising a pliable and resilient material, the connector support coupled to the housing and configured to support the connector as it passes from the interior portion to the exterior portion of the housing. The imaging system includes a flexible circuit configured to electrically couple the connector to the main printed circuit board, the flexible circuit coupled to a portion of the connector that is within the interior of the housing. The connector support is configured to absorb forces applied to the connector to allow relative movement of the connector and the housing.

In some embodiments of the first aspect, the connector support comprises a rubber material. In some embodiments of the first aspect, the connector support comprises grooves configured to mate with edges of the housing. In some embodiments of the first aspect, the connector comprises a micro-USB cable or a lightning cable. In some embodiments of the first aspect, the main printed circuit board comprises an image sensor and a shutter flag. In some embodiments of the first aspect, the connector support comprises a connector support slot through which the connector extends. In some embodiments of the first aspect, the flexible circuit is configured to maintain an electrical connection between the main printed circuit board and the connector when there is relative movement between the connector and the main printed circuit board.

In some embodiments of the first aspect, the connector is the sole mechanical support between the imaging system and a personal electronic device connected to the imaging system. In some embodiments of the first aspect, the connector is the sole electrical connection between the imaging system and a personal electronic device connected to the imaging system. In some embodiments of the first aspect, the connector is the sole means of communication between the imaging system and a personal electronic device connected to the imaging system.

In some embodiments of the first aspect, the imaging system comprises a thermal camera.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to an imaging system with a connector configured to be able to accommodate differential movement between a camera housing and a personal electronic device to which it is connected. The connector is thus configured through the use of a connector support that is pliable and resilient as well as a flexible circuit electrically coupling the connector to a main printed circuit board of the imaging system. Thus, in some embodiments, the disclosed imaging system can be electrically and mechanically coupled to a personal electronic device (e.g., a smartphone) through the connector on the imaging system, the electrical and mechanical connection configured to accommodate for relative movement between the imaging system and the personal electronic device. Advantageously, this can allow the imaging system to be attached to the personal electronic device and to resist harming the connector on the personal electronic device when there are differences in movement between the personal electronic device and the camera.

Although examples and implementations described herein focus, for the purpose of illustration, on implementation in an infrared camera, the systems and methods disclosed herein can be implemented in other devices that are configured to act as peripheral devices for a personal electronic device. Various aspects of the disclosure will now be described with regard to certain examples and embodiments, which are intended to illustrate but not limit the disclosure.

Some embodiments described herein provide for thermal cameras that are more robust for casual users through a connector that mechanically accommodates relative movement between the camera and a connected personal electronic device. Some embodiments described herein provide for a thermal camera comprising a mass-produced, interchangeable connector, the connector configured to be robust when the thermal camera is connected to a personal electronic device. Some embodiments described herein provide for a connector on a thermal camera that reduces stresses on a complementary connector on a personal electronic device with the camera is connected to the personal electronic device and there is relative movement between the camera and the device.

Example Thermal Camera

Figure 1:
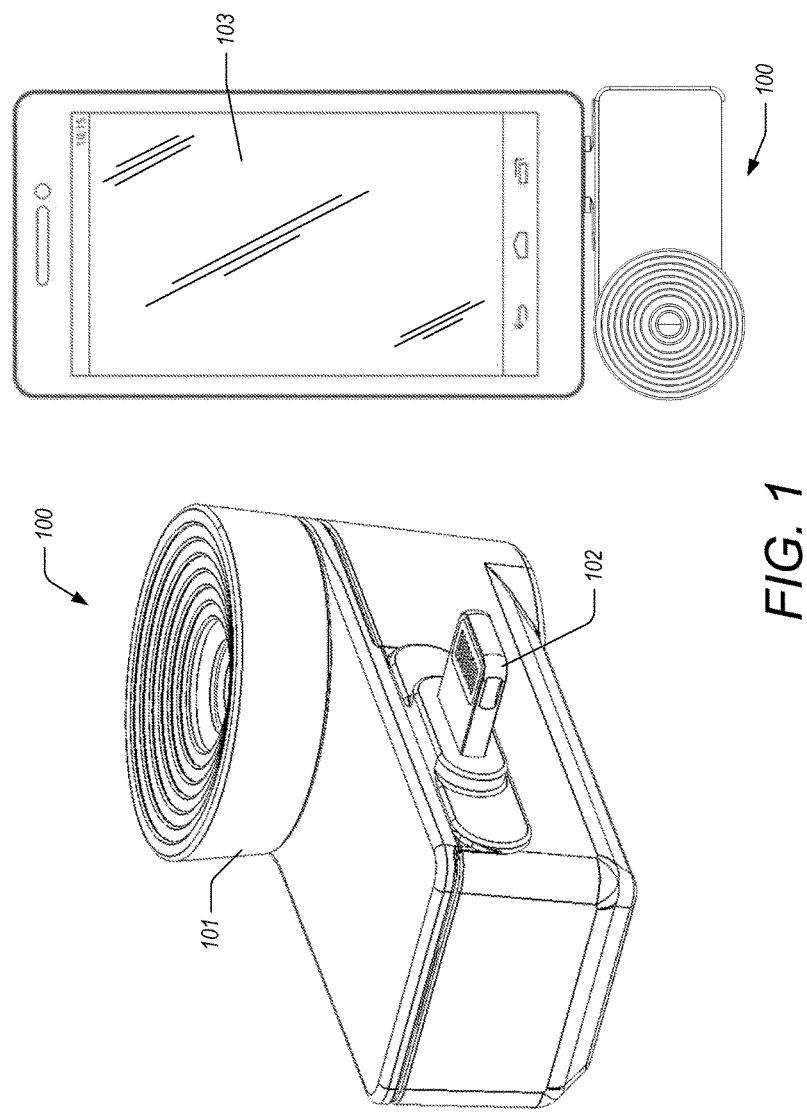
FIG. 1 illustrates an example thermal camera and the example thermal camera connected to a personal electronic device.

FIG. 1 illustrates an example thermal camera 100 (left) and the example thermal camera 100 connected to a personal electronic device 103 (right). The personal electronic device 103 can be a mobile device such as a smartphone, tablet, or the like. The thermal camera 100 is configured to operate as a peripheral device for the personal electronic device 103. For example, the thermal camera 100 can be configured to acquire infrared image data of a scene and to transmit that acquired data to the personal electronic device 103 for further processing and/or display. To mechanically and electrically couple to the personal electronic device 103, the thermal camera 100 can include a thermal camera connector 102 configured to plug into a corresponding interface on the personal electronic device 103. The thermal camera 100 includes camera housing 101 through which the connector 102 extends to electrically couple the personal electronic device 103 to circuitry within the housing 101 of the thermal camera 100.

In some embodiments, the thermal camera 100 is mechanically coupled to the personal electronic device 103 through the connector 102, wherein the connector 102 is the sole means of mechanical attachment between the thermal camera 100 and the personal electronic device 103. In some embodiments, the thermal camera 100 is electrically coupled to the personal electronic device 103 through the connector 102, wherein the connector 102 is the sole electrical connection between the thermal camera 100 and the personal electronic device 103. In some embodiments, the thermal camera 100 is electrically coupled to the personal electronic device 103 through the connector 102, wherein the connector 102 provides the sole means of communication between the thermal camera 100 and the personal electronic device 103. The connector 102 can be any of a variety of connectors suitable for connecting with a personal electronic device, such as a lightning connector, a micro-USB connector, or the like.

Figure 2A:
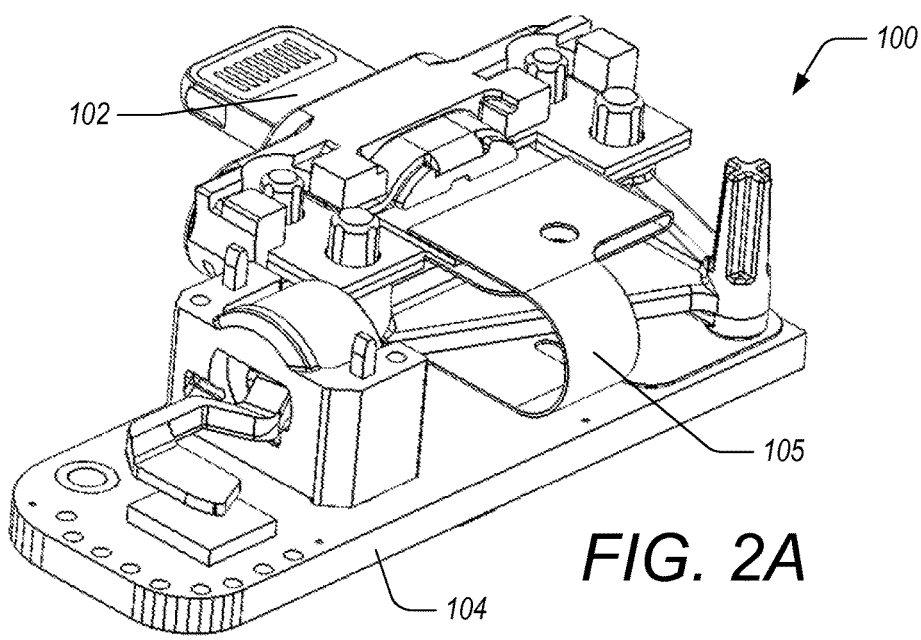
FIGS. 2A and 2B illustrate components within the enclosure of an example thermal camera.
Figure 2B:
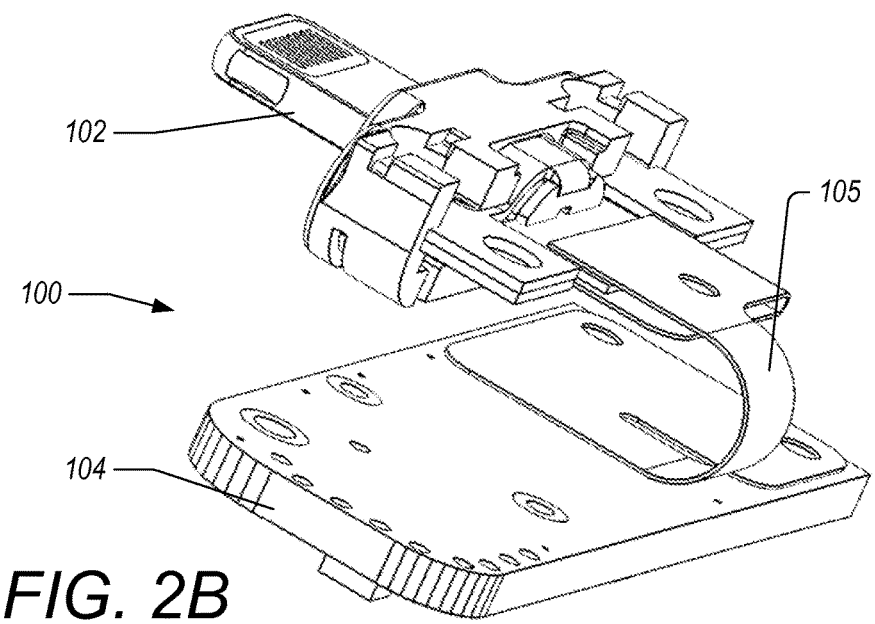

FIGS. 2A and 2B illustrate components within the housing 101 of the thermal camera 100. The thermal camera 100 can include a main printed circuit board 104 within the housing, the main printed circuit board 104 configured to include and/or support circuitry and other components of the thermal camera 100. The user-accessible connector 102 can be electrically coupled to the main printed circuit board 104 through a flexible circuit 105 that attaches to an end of the connector 102 that is internal to the housing 101 and to the main printed circuit board 104. In this way, the connector 102 is mechanically isolated from the main printed circuit board 104 in the sense that movement of the connector 102 relative to the housing 101 does not necessarily translate into movement of the main printed circuit board 104. For example, user-accessible connectors (e.g., micro-USB connectors, lightning connectors, etc.) are relatively fragile and may be accidentally exposed to forces great enough to damage them. If the connectors are rigidly attached to a printed circuit board assembly, there is a significant chance of damage to the printed circuit board assembly when such a force is applied to the connector (e.g., compression, bending, tension, twisting, etc.). Thus, the flexible circuit 105 allows for forces to be applied to the connector 102 that are not directly transmitted to the main printed circuit board 104. Similarly, due at least in part to the connector 102 being mechanically isolated from the housing 101 and the main printed circuit board 104, movement of the camera 101 relative to the personal electronic device 103 can be dampened or reduced at the connector 102, resulting in reduced stresses on the complementary connector on the personal electronic device 103. This can protect the personal electronic device 103 from damage when there is differential movement between the camera 100 and the personal electronic device 103.

Figure 3A:
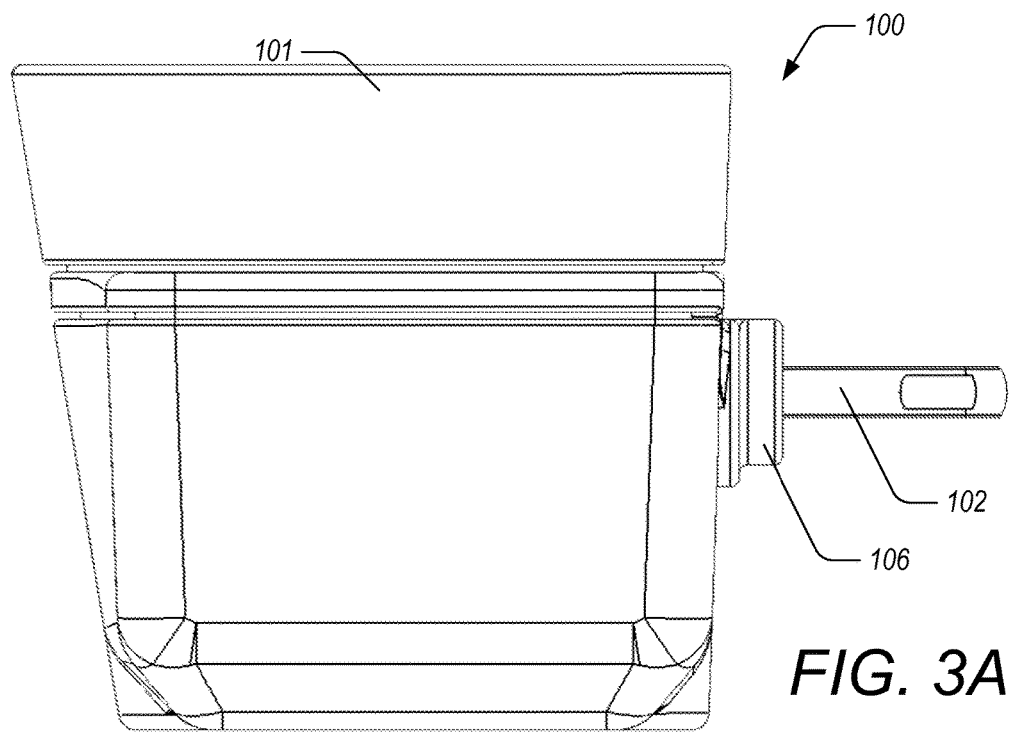
FIG. 3A illustrates a side view of an example thermal camera with a thermal camera connector and a connector support coupled to a housing of the thermal camera.
Figure 3B:
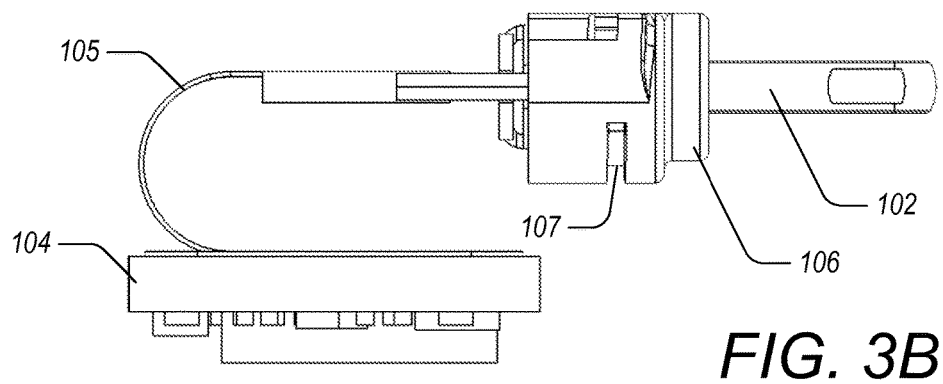
FIG. 3B illustrates a side view of an example thermal camera without a housing or enclosure, the thermal camera connector electrically coupled to the main printed circuit board assembly through a flexible circuit.

FIG. 3A illustrates a side view of the thermal camera 100 with a thermal camera connector 102 and a connector support 106 coupled to a housing 101 of the thermal camera 100. FIG. 3B illustrates a side view of the thermal camera 100 without the housing 101 to show that the thermal camera connector 102 is electrically coupled to the main printed circuit board 104 through the flexible circuit 105. The combination of the connector 102, the connector support 106, and the flexible circuit 105 is configured to provide a robust mechanical and electrical connection between the connector 102, the personal electronic device 103, and the main printed circuit board 104. In certain embodiments, the connector support 106 is configured to allow the connector 102 to move relative to the housing 101. When the connector 102 moves relative to the housing 101 (e.g., due to relative movement of the personal electronic device 103 and the housing 101), the flexible circuit 105 is configured to move as well to accommodate the resultant relative movement of the main printed circuit board 104 and the connector 102 while maintaining an electrical connection between them.

In various implementations, the main printed circuit board 104 is rigidly attached to an interior of the housing 101. The connector support 106 can be configured to accommodate movement of the connector 102 relative to the housing 101. In some embodiments, the connector support 106 is configured to make the mechanical connection between the connector 102 and the housing 101 less rigid due at least in part to the connector support 106 being made of a compliant and resilient material, such as rubber or other similar material that can deform under application of a force and return to its original shape after the force is removed. This configuration has the advantage that the mechanical connection between the connector 102 and the housing 101 is made less robust while maintaining a robust electrical connection between the connector 102 and the main printed circuit board 104 through the flexible circuit 105. Thus, when the connector 102 experiences a force due to its connection to the personal electronic device 103, that force can be at least partially absorbed by the connector support 106. In such a situation, the connector 102 can move with the personal electronic device 103, the connector support 106 can deform under the forces arising from movement of the connector 102, and the connector support 106 can transfer the mitigated forces to the housing 101, resulting in less force and movement being transferred to the housing 101. This can advantageously reduce forces and stresses at the connection interface on the personal electronic device 103. Likewise, in this situation the flexible circuit 105 can move in response to movement of the connector 102 relative to the housing 101 without transferring significant forces to the main printed circuit board 104, which is rigidly attached to the housing 101.

In some embodiments, the connector support 106 can be attached to the housing 101 through a variety of mounting means, including any combination of press fit, adhesive, and/or mechanical fasteners. In some embodiments, the main printed circuit board 104 can be rigidly attached to the housing 101 through a variety of fastening techniques including any combination of press fit, adhesive, and/or mechanical fasteners In some embodiments, the connector 102 can be flexibly, electrically connected to the main printed circuit board 104 with the flexible circuit 105 that provides little or no mechanical linkage between the connector 102 and the main printed circuit board 104.

Figure 4:
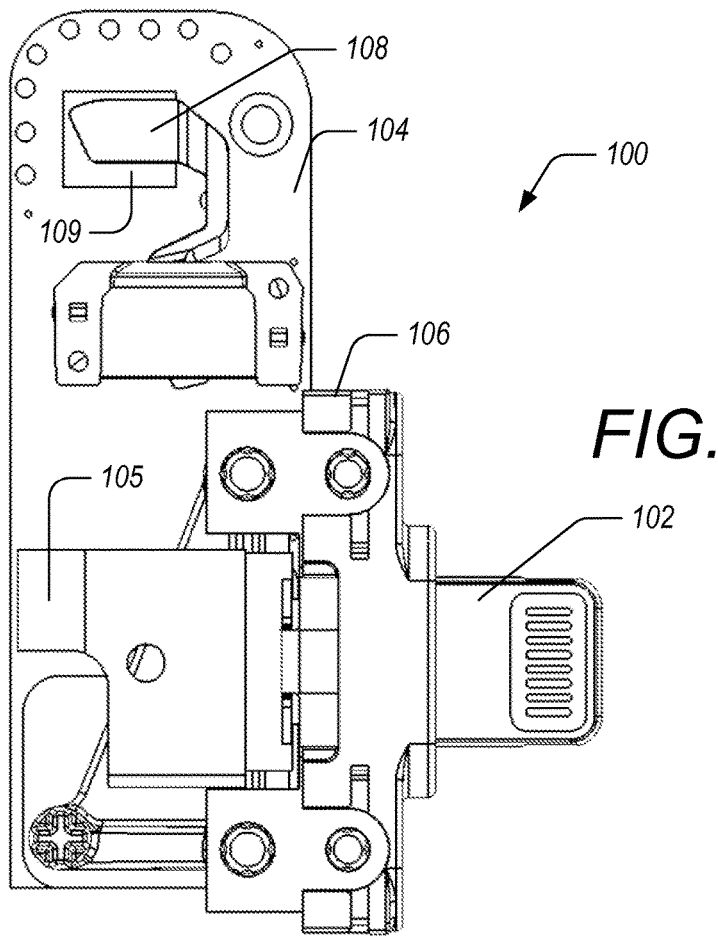
FIG. 4 illustrates a top view of the connector, connector support, printed circuit board assembly, flexible circuit, and thermal camera core of an example thermal camera.

FIG. 4 illustrates a top view of the connector 102, the connector support 106, the main printed circuit board 104, the flexible circuit 105, and thermal camera core comprising a shutter flag 108 and an image sensor 109 (such as a focal plane array) of the thermal camera 101. Flexible circuits, like the flexible circuit 105, can be used to allow relative motion of one electrical component to another and/or to solve a difficult interconnect packaging problem (e.g., by folding or rolling up the flexible circuit). The flexible circuit implementation disclosed herein works to treat the low-value external connector 102 as a "sacrificial" part that can absorb forces and be damaged, while the flexible circuit 105 acts as a strain relief or service loop protecting the high-value main printed circuit board 104.

Figure 5:
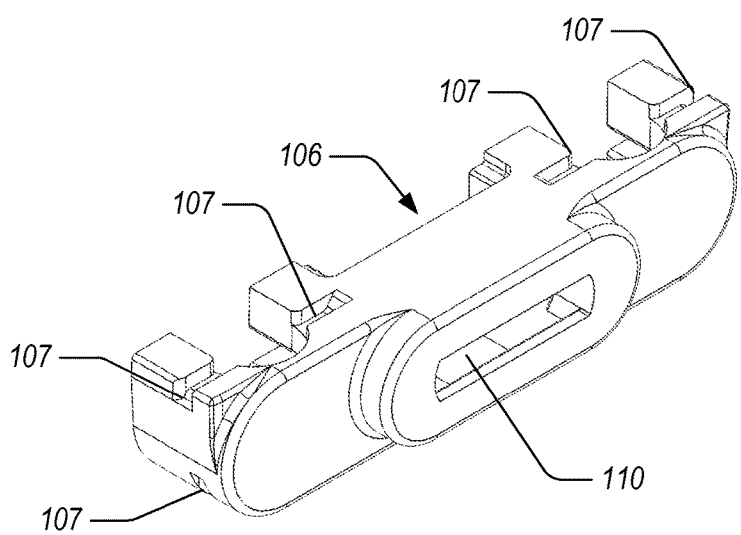
FIG. 5 illustrates an example connector support for use with a thermal camera having a thermal camera connector extending from a housing of the thermal camera.

FIG. 5 illustrates an example connector support 106 for use with a thermal camera 100 having a connector 102 extending from a housing 101 of the thermal camera 100. The connector support 106 can include connector support grooves 107 configured to mate with corresponding features of the housing 101,. Edges of the housing 101 can fit within the grooves 107 so that the connector support 106 remains in position relative to the housing 101 when the connector support 106 is exposed to normal operating forces. The connector support 106 includes a connector support slot 110 through which the connector 102 extends from an interior portion of the housing 101 to outside of the housing 101. The connector support 106 can be made of a material or a combination of materials that deform under forces and that returns to its shape when the force is removed. The connector support slot 110 positions the connector 102 in such a way that the connector support 106 can be configured to absorb forces (within a reasonable range of forces) in a horizontal direction, a vertical direction, towards the housing (e.g., a "pushing" force), away from the housing (e.g., a "pulling" force), or any combination of these.

The connector support 106 can be configured to conform to standards set by personal electronic device manufacturers with regard to forces that can be applied to connection interfaces of those personal electronic devices. The connector support 106 and connector 102 can be configured to meet such standards while maintaining a robust mount of the main printed circuit board 104 within the housing 101.

The embodiments described herein are exemplary. Modifications, rearrangements, substitutes, etc. may be made to these embodiments and still be encompassed within the teachings set forth herein.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. An imaging system comprising:
    a housing configured to enclose and support components of the imaging system;
    a main printed circuit board rigidly coupled to the housing;
    a connector configured to connect to a personal electronic device, the connector configured to provide a mechanical and electrical connection to a personal electronic device, the connector extending from an interior portion of the housing to an exterior portion of the housing;
    a connector support comprising a pliable and resilient material, the connector support coupled to the housing and configured to support the connector as it passes from the interior portion to the exterior portion of the housing; and
    a flex circuit configured to electrically couple the connector to the main printed circuit board, the flex circuit comprising at least one planar portion coupled to a portion of the connector that is within the interior of the housing,
    wherein the connector support is configured to absorb forces applied to the connector to allow relative movement of the connector and the housing.

2. The imaging system of claim 1, wherein the connector support comprises a rubber material.

3. The imaging system of claim 1, wherein the connector support comprises grooves configured to mate with edges of the housing.

4. The imaging system of claim 1, wherein the connector comprises a micro-USB cable or a lightning cable.

5. The imaging system of claim 1, wherein the main printed circuit board comprises an image sensor and a shutter flag.

6. The imaging system of claim 1, wherein the connector support comprises a connector support slot through which the connector extends.

7. The imaging system of claim 1, wherein the flex circuit is configured to maintain an electrical connection between the main printed circuit board and the connector when there is relative movement between the connector and the main printed circuit board.

8. The imaging system of claim 1, wherein the connector is the sole mechanical support between the imaging system and a personal electronic device connected to the imaging system.

9. The imaging system of claim 1, wherein the connector is the sole electrical connection between the imaging system and a personal electronic device connected to the imaging system.

10. The imaging system of claim 1, wherein the connector is the sole means of communication between the imaging system and a personal electronic device connected to the imaging system.

11. The imaging system of claim 1, wherein the imaging system comprises a thermal camera.

* * * * *